Dec. 26, 1967  C. I. PETERS, JR  3,360,726
RADIATION RESPONSIVE DEVICE
Filed March 1, 1966  2 Sheets-Sheet 1
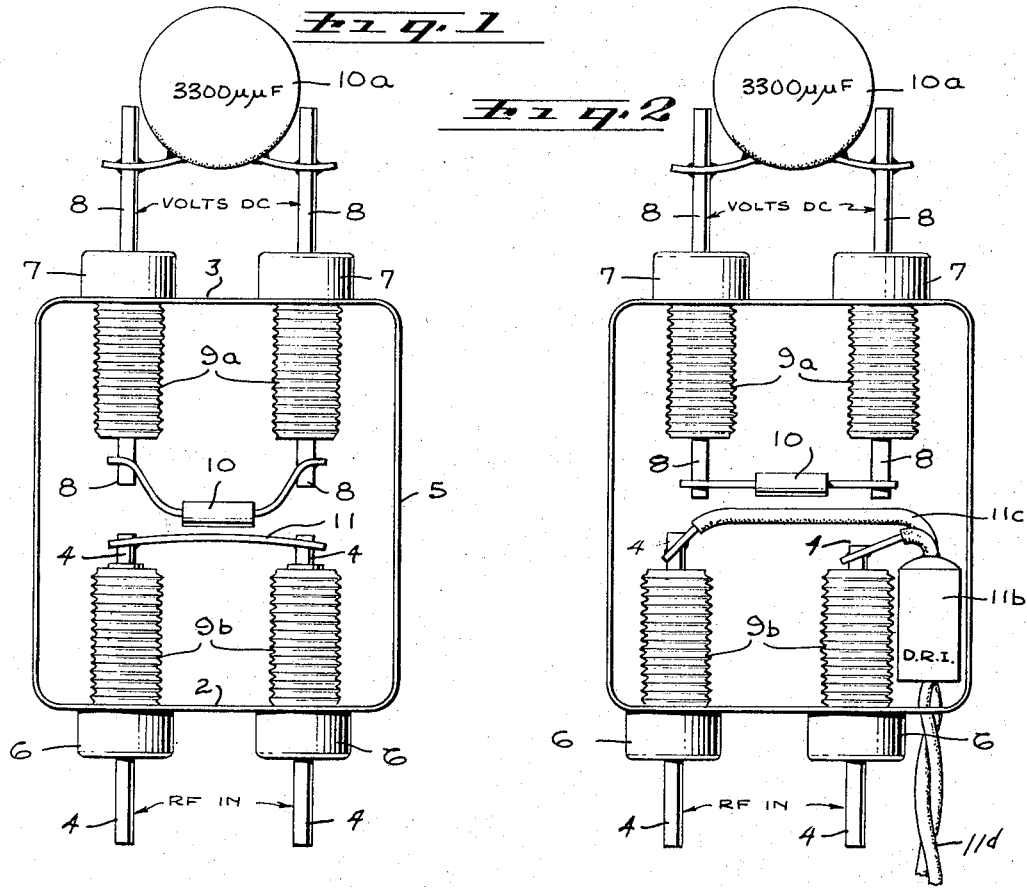
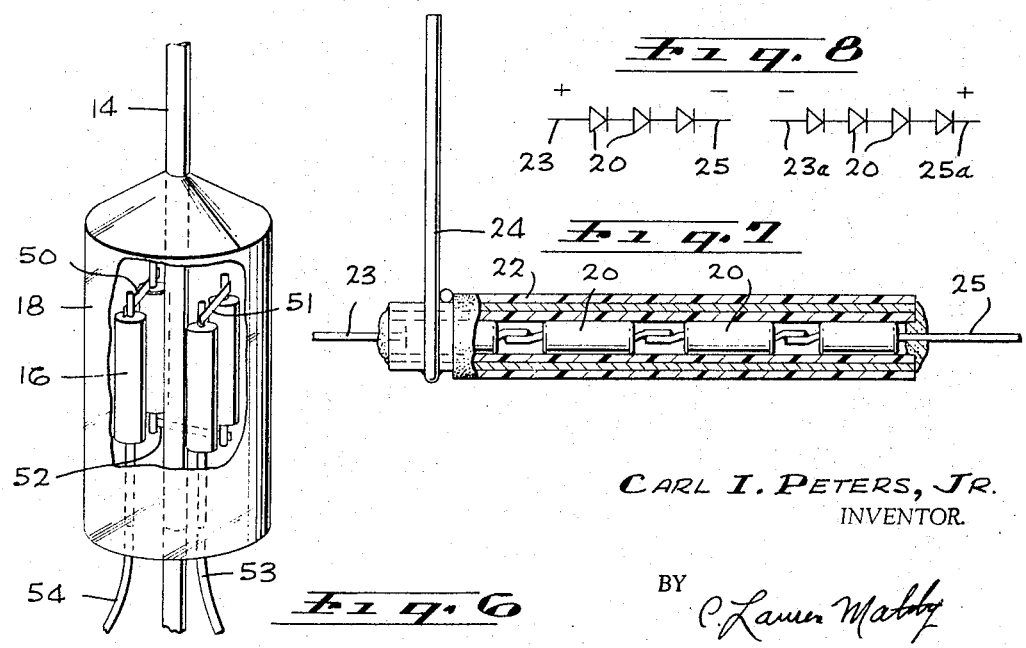
CARL I. PETERS, JR.
INVENTOR.
BY
ATTORNEY

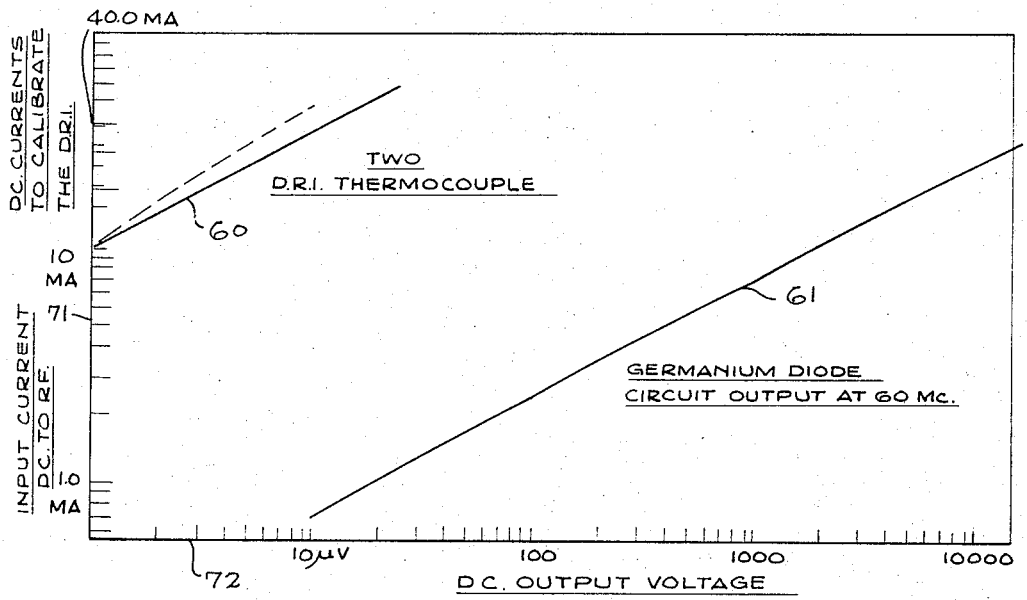
*Fig. 3*
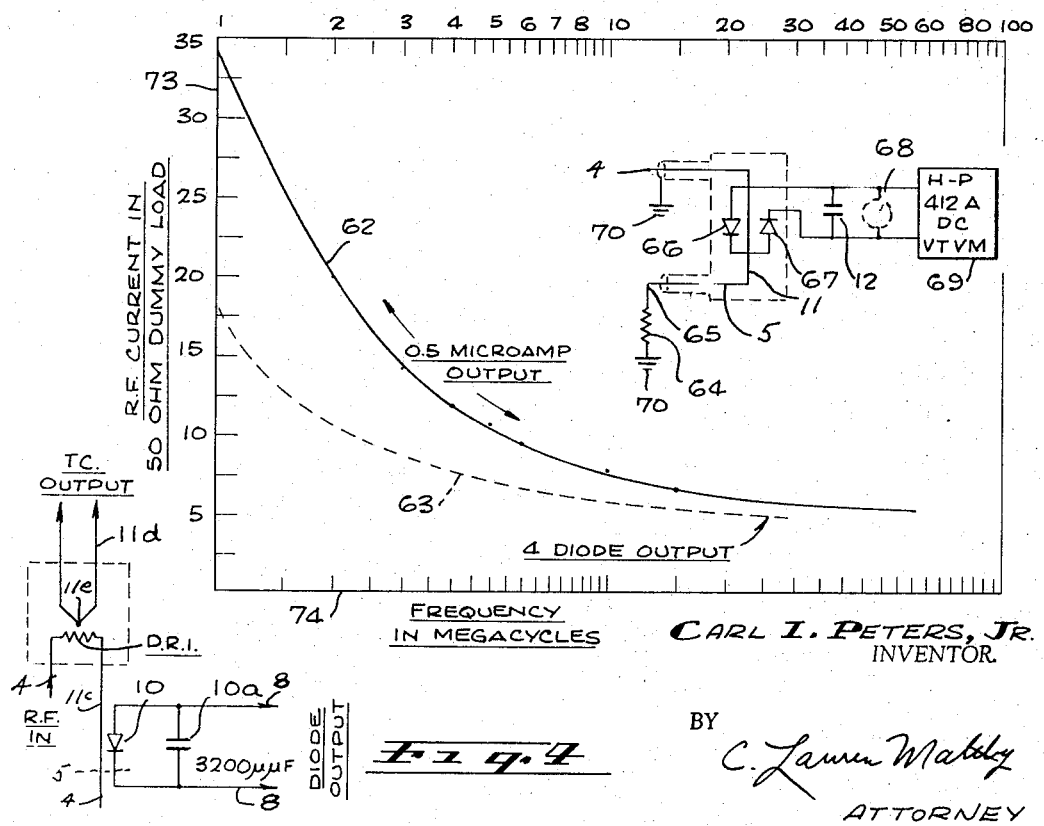
*Fig. 5*
*Fig. 4*
Carl I. Peters, Jr.
INVENTOR

United States Patent Office 3,360,726
Patented Dec. 26, 1967

3,360,726
RADIATION RESPONSIVE DEVICE
Carl I. Peters, Jr., 513–B Saratoga Ave.,
China Lake, Calif. 93555
Filed Mar. 1, 1966, Ser. No. 530,996
2 Claims. (Cl. 324—119)

ABSTRACT OF THE DISCLOSURE

A germanium point contact diode is used as the detection means in radio frequency detecting devices.

This application is a continuation-in-part of application Ser. No. 309,424, filed Sept. 17, 1963, now abandoned entitled: "Radio Frequency Energy Converter."

The general purpose of the invention is to provide a method and the apparatus for detecting and measuring RF energy.

The particular utility of the device is in measuring small radio frequency fields in Electro-Explosive Device actuated systems. However, the device is in fact a detector of any form of radiant energy from the low radio frequency range through light wavelengths. The output of the device of this invention in response to the radiant energy to which it is exposed is a direct current potential. The amplitude of this potential is directly proportional to the amplitude of the radiant energy field in which it is placed, or to which it may be subjected. When the field is within those frequencies where communication, radio broadcast, or radar, or other microwave phenomena are being exploited, the output of the device will include the same amplitude variations as those present in the radiation field to which it is exposed. When this output is observed on an oscillograph as in response to an unmodulated wave phenomenon, the trace on the oscillograph is a straight line such as might be observed when a battery is placed across the oscillograph terminals. The trace line will be positioned above or below a zero center position, depending on the amplitude and polarity of the direct current from the device. It has been observed that when the radiant energy is in the visible light range a reversal in polarity of the direct current potentials occurs.

In a practical embodiment of the apparatus of the invention it develops direct current voltage and current by induction from the RF energy present in an adjacent piece of wire. By the use of this invention one is able to provide a means for measuring RF energy in a low impedance circuit, such as the ignition circuit of an electro-explosive device (EED). The use of the invention thus in no way affects the circuit to be measured because it is placed adjacent to and is not connected conductively to the circuit being measured. The impedance of the circuit to be measured will only influence this invention to the extent that the output of the invention device is directly proportional to the impedance of the circuit involved since this will produce more current in the circuit under test thus inducing greater energy in the adjacent device of the invention.

At the present time the most widely used device for RF energy measurements is the thermocouple. In radiation hazards investigations the thermocouple takes the form of a simulated EED in which the "bridgewire" of the EED is used as a heater element. The energy is measured as a function of the rise in the temperature of the "bridgewire." There are important limitations and disadvantages of the thermocouple when used in this application:

(a) Efficiency of thermocouples is low because only a small fraction of the heat energy is converted into electrical energy.

(b) As used in EED simulators the thermocouple is inaccurate because of the lack of a controlled temperature reference "junction." Repeatability suffers and calibration is necessary each time it is used.

(c) The useful range of a thermocouple type ammeter is restricted at the low end by the low conversion factor and, at the high end, by danger of burning out the heater element.

(d) The film type thermocouple junctions that are used in EED simulators are delicate and subject to change of characteristics and subject to change with time.

(e) The electronic equipment necessary to allow thermocouple read-out is large and very expensive. The equipment size is not compatible with some weapons and necessitates changes to the weapons symmetry.

(f) Two simulated EEDs operated at 10 ma. and 3 ma. respectively are necessary to accurately cover the area of interest in radiation hazard problems.

In the present invention none of the above-mentioned difficulties is encountered. This is due to the fact that radio frequency energy to be measured directly induces in a germanium diode a characteristic direct-current potential which is then filtered and applied to a suitable load or indicating device connected to the output of the diode. Point contact germanium diodes are preferably used in the invention. This effect has not been observed in silicon diodes. The effect which has been observed is much like the photo-electric effect in its character in that the responsiveness of the device such as a point contact germanium diode to the radiation results in a change in character of the diode resulting in its developing a D-C potential.

The diode is not connected conductively to the source of radio frequency to be measured but rather is positioned closely adjacent a wire or other similar receptor element carrying the radio frequency energy under test from which the radiation thereof induces in the diode a direct current potential. Therefore, there is no direct loading of the circuit providing the radio frequency energy which is being measured or detected.

The implementation of devices according to this invention includes germanium diode units connected in series or individually and placed adjacent a wire carrying the radio frequency energy under test. The "wire" may be that conventionally considered a wire, or it may be a solid metallic assembly such as a brass rod into which compartments have been drilled to receive the diodes. In any event the "wire" or the rod is the radio frequency detecting element from which the above-described direct current potential is dervived. It might be considered as a probe in one sense of the utility thereof Accordingly, it is an object of this invention to provide a test device particularly applicable to electro-explosive triggering elements with which the circuits of such elements can be tested non-destructively, directly and efficiently without danger of detonating the instrumentality which the triggering element is designed to actuate.

It is another object of this invention to provide a passive detecting device for radiant energy in the radio frequency or visible light range which develops a direct current potential in the presence of such radiation.

It is yet another object of this invention to provide a detecting device for radio frequency or other radiant energy wherein the output is a direct current potential the amplitude of which is directly proportioned to the amplitude or intensity of the radio frequency or other radiant energy.

It is a further object of this invention to provide a radio frequency measuring device wherein no direct conductive connection is made between the element carrying radio-frequency energy being measured and a germanium diode unit or assembly which detects and converts the radio frequency energy to a direct current potential which is applied to an indicating instrument.

These and other objects of the invention will be more clearly understood from the specification which follows and the appended claims taken together with the accompanying drawings in which:

FIGURE 1 is a view of the invention in a suitable container shown with the cover thereof removed;

FIGURE 2 is a view similar to that of FIGURE 1 in which another application of the invention is shown;

FIGURE 3 is a graphic chart showing certain characteristics of a prior art thermocouple unit in comparison with those of a device according to this invention;

FIGURE 4 is a circuit diagram of the invention showing the device of the invention in its use relationship to a source of radio-frequency energy;

FIGURE 5 is a graphic chart showing various output characteristics of devices according to the invention with an inset circuit diagram showing an alternative circuit to that shown in FIGURE 4;

FIGURE 6 is an illustration of another embodiment of the invention showing in a partially cutaway view an assembly of a plurality of diodes arranged in accordance with the invention;

FIGURE 7 is an alternative implementation of a device according to the invention such as shown in FIGURE 6 wherein the interior is revealed in a partially cross-sectional form; and FIGURE 8 shows explanatory circuit diagrams representative of the devices shown in FIGURES 6 and 7 and explained in the specification.

In the accompanying drawing FIGURES 1 and 2 show the implementation of circuits of working models according to this invention. In FIGURE 1 a IN34A point contact germanium diode 10 is shown installed on standoff insulators 9a in a container 5 parallel and very close to a wire 11 carrying RF energy. Wire 11 is connected on standoff insulators 9b opposite insulators 9a in container 5. Both standoff insulators 9a and 9b have feed thru wires 8—8, 4—4 therethrough leading externally of container 5 on opposite edges thereof. Insulators 7—7 and 6—6 insulate wires 4—4 and 8—8 from container 5. FIGURE 2 shows an assembly in which the diode output is compared with a D.R.I. (Direct Reading Instrument) which is a simulated EED. FIGURE 3 is a graph showing the comparative results obtained at 60 mc. using the device shown in FIGURE 2. FIGURE 4 shows two forms of detection means for the radio frequency energy in a circuit. In (a) the present invention utilizing a diode is shown. In (b) the prior art form of a "bridgewire" or thermocouple is shown. The drawing is so arranged that it may clearly be observed that the diode 10 is adjacent the return wire for the radio frequency (RF) energy input to the resistance element of the thermocouple sensor (TC). This adjacency as herein illustrated and also shown in FIGURES 1 and 2 at 11 is the heart of the operation of the invention, the currents passing along the return wire (FIG. 4(b) and in wire 11 (FIGS. 1 and 2) induce currents in the diode 10 resulting in the direct current output of the diode 10 by which the radio frequency energy is observed or measured or indicated as shown in FIGURE 5. It should be noted that the articles identified as 9a and 9b in the several figures are standoff insulating devices, also called "feed through" terminals. Thus only current in wire 11 induces the energy in diode 10 to be converted to direct current by diode 10. The induction is believed to be due to the electrostatic field (E-field) of energy surrounding the wire 11 and coupled to diode 10. FIGURE 5 is a graph showing the results of using the same assembly in which the output voltage of the D.R.I. is held constant from 0.34 mc. to 100 mc. and the diode developed DC voltage was recorded.

With this evidence so favorable using one germanium diode, two diodes 66, 67 (FIGURE 5) and then four (FIGURES 6–7) were assembled as a physical square although electrically connected in series and tested with the wire carrying RF energy passing through the diode assembly. The diodes were connected in series and encapsulated in an epoxy plastic with a glass cover. The circuit 4, 11, 64, 70 and results 62 are shown in the graph in FIGURE 5. The four diode output is graphed at 63.

It is not necessary that a conductive wire return circuit be provided for operation of the devices of this invention. An antenna such as a vertical whip in the radiation field may be used. As has been pointed out above the responsiveness of the device according to this invention (here diode 10) does not necessarily occur in the convention-accepted diode fashion. It has been suggested in the introductory material hereinabove that the effect may be like a photoelectric effect. While the exact explanation of the operation of devices according to the invention cannot be fully made here, it is believed that rather than the diode 10, the device be considered, for example, p-doped germanium. This material which is readily available in the form of germanium diodes such as diode 10 is therefore used in this form.

As shown in FIGURES 1 and 2, the invention comprises a housing 5 preferably but not necessarily of metal and which may be generally rectangular in shape as illustrated, or of any other shape, as suits the requirements of the equipments to which the invention may be applied. As illustrated in FIGURES 1 and 2 the cover of the housing 5 has been removed to reveal the interior construction thereof. In opposite sides or ends 2 and 3 of the housing 5 are installed insulated feed through terminals 4—4 and 8—8. Terminals 4—4 are in end 2 and include enlarged end portions 6 and threaded interior portions 9b. By threading these terminals into container 5 at ends 2 and 3 they are securely installed. Similarly terminals 8—8 have an enlarged insulative portion 7—7 and threaded portions 9a. The portions 6, 7, 9a and 9b are of an insulative material. The wires 4—4 and 8—8 in the connection terminals are fed through elements to which the appropriate components of the devices according to this invention are connected. For example, in FIGURE 1 germanium diode 10 is connected to terminals 8—8 within the container 5. A capacitor 10a is connected to the terminals 8—8 externally of the container 5. The wire connections 8—8 are insulated from container 5 by the plastic portions of the terminals 7—7 and 9a. Similarly, externally of container 5 the leads 4—4 are for connection to an external source of radio frequency energy normally to be applied to the devices as above described. Within container 5 leads 4—4 are shunted by wire or receptor 11 which can be seen to be closely adjacent to diode 10. This proximity of wire junction 11 and diode 10 is the heart of the invention. The capacitor 10a used in FIGURES 1 and 2, and elsewhere will filter any amplitude variation at rates in excess of the audible frequency range.

The operation of the device according to this invention as shown in FIGURE 1, is as follows:

Radio frequency energy applied directly through terminals 4—4 is conductively present across the receptor 11 connected thereto within container 5. Terminals 4—4 may be in series with a load in the radio frequency source. The electrostatic component of the radio frequency field which surrounds receptor 11 cuts across diode 10 inducing in the diode a direct current appearing on leads 8—8. High frequency amplitude pulsations are filtered out by capacitor 10a so that an indicating direct current milliammeter or a voltmeter connected to exterior wire terminals 8—8 will respond thereto and the resulting current or voltage may be read thereon. The connections shown in FIGURE 4 identified as "diode output" are the exterior leads 8—8.

The receptor element identified as 11 in FIGURE 1 may be considered a series impedance. To the extent that such a receptor wire as 11 is heated by the radio frequency energy passing therethrough, it is a very small resistance, or impedance.

The direct reading thermocouple assembly 11b (FIG. 2) contains the conventional resistance unit (see FIG. 4) the heating of which affects sensing element 11e to produce a voltage which may be detected by diode 10. Diode 10, as above, here also derives a direct current which can actuate an indicating instrument.

In the circuit shown in FIGURE 5 two diodes 66 and 67 are connected in series and arranged on either side of a receptor wire 11 within the housing 5 shown in dashed line. A load resistor 64 is connected from one end 65 of the input circuit while the other end 4 would ordinarily connect to the source of radio frequency energy. Capacitor 12 across the series diodes 66, 67 filters any high frequency variations in the D-C. It should be noted that the filtering action of capacitor 12 is necessary for the modulation components upon the radiation field becauses the D-C output available at the instruments 68 or 69 will be a pure D-C when only the radiation without modulation is involved. The graphic line 61 in the chart of FIGURE 3 clearly shows that the D-C output voltage calibrated along the horizontal axis at 72 increases in direct proportion to the R-F current applied to the device of this invention from the lowest frequency (D-C) through R-F and even radiant energy such as light.

The graph in FIGURE 5 shows further the output D-C characteristic of .5 microamp at different frequencies (line 62) for a device according to this invention. Note that it takes a relative input current of 20 at 2 megacycles to produce a .5 microamp output while at 20 megacycles it takes only about 7.5 in the relative R-F in scale. This explains the result previously mentioned that as the frequency increases the D-C output of the device according to the invention increases. This output is measured in volts.

Since the line 61 in FIGURE 3 is drawn for 60 megacycles applied to the device it should be obvious from the chart of FIGURE 3 that were the 60 mc. (megacycle) current to be modulated in amplitude that in the absence of a capacitor such as 12 one would pick up only the modulated component. If the modulation were to be an audio frequency signal the audio would appear and if the device 68 were replaced with an audio transducer the audio would be heard. A voltmeter 69 or a current indicator 68 (shown dashed) may be used connected across diodes 66, 67 to indicate the output of the device when radio-frequency energy is applied to terminals 4, 65 and appear on receptor 11 to induce the direct current potential in diodes 66, and 67, which may be detected by indicators 68 or 69.

As has been described above, in the operation of this invention a point contact germanium diode such as 10 is used to develop the direct current potential in direct ratio to the amplitude or intensity of RF energy. In this application the radio frequency energy is that which would be present in one lead of a "bridgewire" assembly used to represent an EED. The polarity of the diode-developed DC voltage and current may be selected by an appropriate connection of the indicating instrument. It has been found when the radiant energy exciting the germanium diode is in the visible range the D-C polarity is reversed from that in response to radio frequency energy.

An ohmmeter, when measuring the diodes' forward resistance, will produce a low resistance reading. The back-resistance is high. The polarity of the voltage and current developed by diodes when influenced by an RF source will be the reverse of the ohmmeter polarity for making the forward resistance measurement. In the visible light range the polarity will be the same as that observed with an ohmmeter.

Diodes connected in series as shown in FIGURE 8 will produce a direct current of the polarities indicated in the figure at 23 and 25 for visible light radiation, and at 23a and 25a for the radio frequency energy.

FIGURE 3 is a chart of the measure of sensitivity of a D.R.I. (60) as compared to the diode circuit (61) according to this invention. At 60 mc. the germanium diode circuit can be seen to be ten times more sensitive. An 0–20 ma. meter at 68, as shown in FIGURE 5, will reliably indicate the presence of 5–6 ma. of RF in the wire such as 11. Only when the diodes are aligned at 90° to the flow of RF energy in wire 11 is the reading affected, and then the developed voltage or current is approximately one-half of that produced in the parallel relationship of diode 10 and wire 11.

This invention responds to the RF voltage potential existing in the wire. If the diodes are on one leg of a transmission line as in FIGURE 1, the direct current and voltage are very small. If the energy source output is properly terminated in a matching impedance the diode output is larger. Open or shorted sections of line will produce outputs in proportion to the E-field surrounding them. When a cable length computed for a voltage node is cut and connected to leads 4—4 the diode follows the voltage maximum but not the current.

All of the foregoing data was assembled from test conditions that used an unmodulated RF carrier.

The advantages of this invention over old methods are:

(a) The invention utilizing germanium diodes positioned parallel to and very close to a wire carrying RF energy develops a DC voltage and current that can be read directly without the necessity of any conversion to AC, amplifying the AC, tape recording the AC, and then playing back the tape for recording on paper and then developing of the photographic paper. The saving in time and money is tremendous. Where only two tests could be performed simultaneously heretofore, now any number can be completed by reading a meter.

(b) The invention is ten times more sensitive than a thermocouple in a similar environment. (FIGURE 3.)

(c) The invention will hold calibration and will respond to a far greater range of voltage levels ($\mu$v. to volts). Its response level is not limited by the diodes but to the indicating device.

(d) The invention can be used to measure RF voltage in a circuit of any impedance. The presence of the invention has no effect on the circuit.

(e) The invention will respond to a modulated signal.

(f) The use of a relatively inexpensive germanium diode as an RF indicator.

The invention lies primarily in the results encountered from germanium diodes close to the field of a source of RF. The alternative of using two (2) and four (4) diodes, as shown in FIGURES 5 through 8, accomplishes results needed to improve the measurement of RF energy in electro-explosive devices (EED).

The invention can respond to a modulated RF signal, and this output is useful in detection of voice modulated signals.

The diode circuit according to this invention can simulate a DC battery that can only be switched on and off by an RF source.

The invention is capable of measuring RF voltage at the end of a transmission line independently of line impedance.

Angular placement of the diode or diodes with reference to the wire will vary the developed voltage or current.

FIGURE 6 shows a physical form which the energy converter of this invention may take. In this figure a receptor element 14 comprising a wire rod which carries the radio frequency energy (as does wire 11) and four series-connected diodes 16 are encapsulated in a thermoplastic insulating medium 18. Receptor 14 would be connected to leads 4—4 in the container 5 such as shown in FIGURE 1. The diodes are connected to together by leads 50, 51, and 52. Leads 53 and 54 are connected to terminals such as 8—8 in FIGURE 1 within container 5.

In FIGURE 7 a simiar plurality of series-connected diodes 20 are shown contained in a receptor tube 22 from which a wire or rod 24 extends. Leads 23–25 would be connected to terminals 8—8 and lead 24 to the source of radio frequency energy.

Alternatively, the unit shown in FIGURE 7 may be laid in a housing such as 5 in place of diode unit 10.

It should be clear from the above that the invention is not limited to a single embodiment but that other forms thereof are available and may be developed by those skilled in the art pertaining hereto in the light of the preceding disclosure.

What is claimed is:

1. A radio frequency energy determining means comprising:
    a housing,
    input terminal means in said housing adapted to be connected to a source of radio frequency energy,
    a conductive wire having a straight portion connected between said input terminal means and within said housing,
    output terminal means in said housing,
    at least one germanium crystal point contact diode having an anode and cathode positioned in said housing so that the longitudinal axis of said diode is parallel with and closely adjacent to said straight wire portion,
    said diode having terminals connected internally, respectively, to the cathode and the anode of said diode,
    said terminals of said diode being connected to said output terminal means so that said terminals connected respectively to said cathode and anode of said diode from the output terminals of said detecting means,
    so that radio frequency energy applied to said input terminal means from said external source is carried by said wire thereby producing an electrostatic field which cuts across the axis of said diode, perpendicular thereto, and said electrostatic field of said radio frequency energy induces a direct current potential in said diode, and
    direct current detecting means connected to the output terminals, having a response which is a function of the frequency of the source of radio frequency energy.

2. The structure defined in claim 1 wherein said direct current detecting means comprises an indicating instrument.

References Cited

UNITED STATES PATENTS

| | | | |
|---|---|---|---|
| 2,546,093 | 3/1951 | Gilbert | 324—119 |
| 2,894,132 | 7/1959 | Skyten | 329—206 X |
| 3,173,091 | 3/1965 | Strull | 329—205 X |
| 3,238,451 | 3/1966 | Shively | 324—58 |

OTHER REFERENCES

Bray et al., "Photo- and Thermo-Effects in p-Type Germanium Rectifiers," pages 141–142.

E. C. Cornelius, Germanium Crystal Diodes, in Electronics Magazine, July 1946, p. 122 relied on.

Sylvania Electric, 21 Circuits for Germanium Crystal Diodes, 1952, p. 5 relied on.

RUDOLPH V. ROLINEC, *Primary Examiner.*

WALTER L. CARLSON, *Examiner.*

G. L. LETT, E. F. KARLSEN, *Assistant Examiners.*